United States Patent Office 2,813,980
Patented Nov. 19, 1957

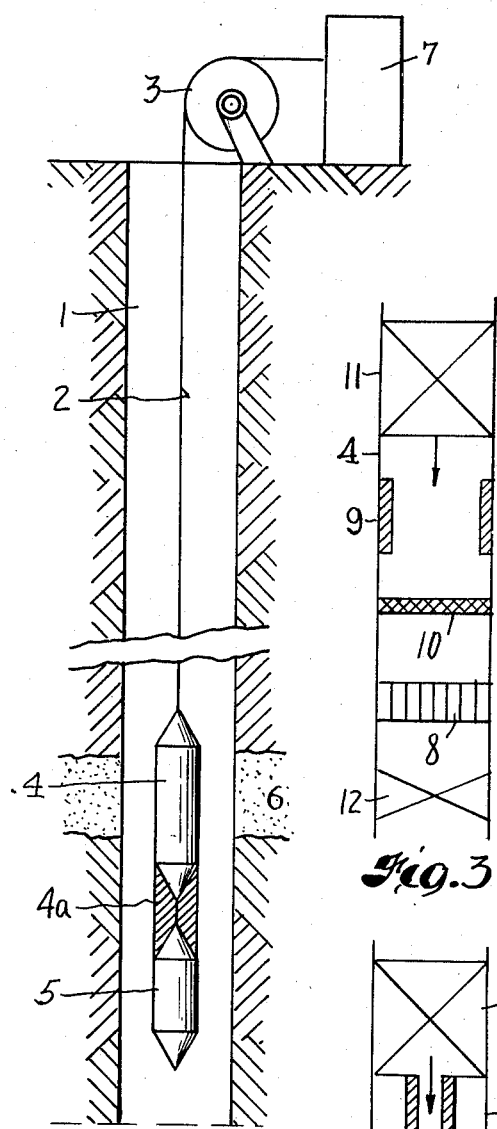
Fig. 1
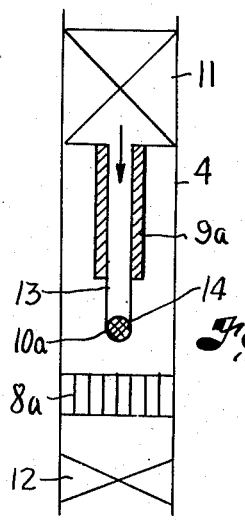
Fig. 3
Fig. 4
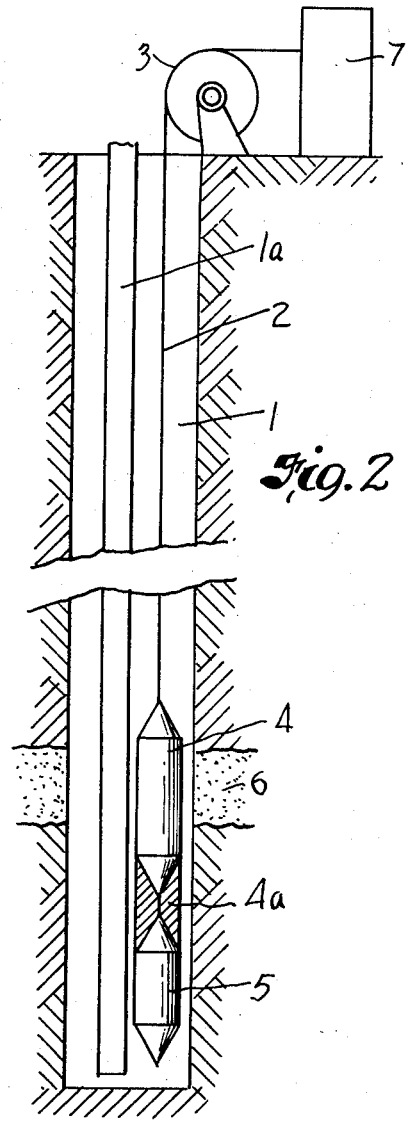
Fig. 2
INVENTOR.
LEENDERT De WITTE
BY
Oberlin & Limbach
ATTORNEYS.

2,813,980

DETECTION OF WATER INFLUX BY RADIOACTIVITY

Leendert de Witte, Ponca City, Okla., assignor to Continental Oil Company, Ponca City, Okla., a corporation of Delaware Application November 13, 1953, Serial No. 391,995

13 Claims. (Cl. 250—43.5)

This invention relates to examining earth formations traversed by a bore hole and more particularly to a method and apparatus for locating the point or points in such a bore hole where connate fluids are entering the hole by means of soluble radioactive materials. The invention relates to the location of points of fluid influx in both cased and uncased wells. By means of the present invention, points at which fluids are entering a bore hole may be quickly and accurately determined without the necessity of elaborate and expensive equipment.

The incursion of water into oil wells represents one of the major sources of expense in the production of petroleum. The pumping of water, handling of emulsions formed with the water and oil, disposal of the water and corrosion resulting from the usually saline water are all costly factors attending the operation of wells producing water along with oil. In many cases it is possible to shut off the flow of water from producing formations by mechanical or chemical methods. Difficulty is encountered in this, however, by the inability to ascertain accurately which portion of the formation is yielding the water.

The principal object of this invention, therefore, is to provide a simple method of locating the sources of water entering a well from a producing zone, thus making it possible to apply suitable treatment where needed, thus making it possible to recover water-free pipeline oil.

Another object of this invention is to provide simple and inexpensive apparatus by which the above method may be carried out.

A further object of this invention is to provide a method and apparatus for determining the location of oil producing horizons in wells.

Other objects of the invention will appear as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the invention comprises the method of detecting and locating points of fluid influx into producing wells which consists in moving a soluble radioactive source material in a seeding device through the well followed by a detector shielded from direct emanations from the radioactive seeder. As the seeder passes a point of fluid entry, a small amount of the soluble radioactive material will be dissolved by the fluid and the resulting solution of radioactive materials flowing past the detector will cause a sudden increase in the reading thus indicating where the fluid has entered the well bore. The detector may be a Geiger-Mueller counter, an ionization chamber, or scintillation cell or other gamma ray detector. If the fluid flow is downward, the seeding device is located above the detector; and if the fluid flow is upward, the seeding device is located below the detector. In this way, the fluid always flows first past the seeder dissolving some of the radioactive material and then past the detector. Water-soluble or oil-soluble radioactive materials are used depending upon whether the fluid influx desired to be located is water or oil. Where difficulty exists is obtaining radioactive substances with sufficiently definite differential solubility in water and oil, hydrophilic and hydrophobic membrances may be used in the seeding device.

In the drawings:

Figure 1 is essentially a diagrammatic illustration of a well bore with the radioactive seeder and detector of this invention positioned therein.

Figure 2 is a diagrammatic illustration of another type of an oil well wherein the radioactive seeder and detector are positioned between the casing 1 and the producing tubing 1–a.

Figure 3 is a diagrammatic illustration of one form of the radioactive seeder assembly of this invention.

Figure 4 is a diagrammatic illustration of another form of the radioactive seeder device of this invention.

Referring more specifically to the drawings and especially to Figure 1: There is illustrated here a single well generally indicated at 1 extending into the earth. Suspended within the well bore on cable 2 from measuring wheel and winch 3 is an assembly comprising a housing for a radioactive tracer or seeder device 4 and a radioactive detector 5. Seeder assembly 4 is adapted to contain a source of radioactive material soluble in the well fluid whose point of influx into the well is desired to be located. Detector 5 is shielded by any suitable means such as a lead shield 4–a from direct emanations from the seeder device. As pointed out above, the detector is spaced above or below the seeder device depending upon the direction of flow of the fluid being detected in the well. Well bore 1 as shown in the drawing penetrates a formation 6, the exact location of which it is desired to ascertain. Electrical connections may be provided from the cable to suitable recording or indicating mechanism indicated generally at 7.

One form of construction which seeder device 4 may take is shown in detail diagrammatically at Figure 3. Tubular housing 4 contains a seeder 8 which is a perforated chamber or container adapted to hold a source of soluble radioactive material so that it may be contacted by the well fluids passing through the housing. In its simplest form, the invention may be carried out with just this much in the way of seeder apparatus; however, because in many instances oil tends to coat the water-soluble radioactive material, thereby preventing its dissolution in the water in the well, and water tends to coat the oil-soluble radioactive material preventing its dissolution in oil, it is desirable to protect the radioactive material in seeder 8 by interposing a membrane of selective permeability within the housing 4 between the seeder and the well fluids within the housing; thus, for example, membrane 10 may be a barrier which is permeable to water but impermeable to oil. In a still more complex form of the seeder apparatus, membranes which are permeable to oil only may be inserted in the housing at 9. Where these membranes are used, it is often necessary to provide a small pumping unit indicated at 11 to force the well fluids through housing 4. A one-way valve is indicated at 12 to prevent a back-flow of well fluids into contact with the seeder.

In operating using the embodiment of the seeder assembly of this invention shown in Figure 3, as the housing is moved through the well bore, well fluids are pumped into the housing 4 by means of pump unit 11. When passing a point of water entry, membranes 9 being permeable to oil, allow the oil in the well fluid to return to the well; and membrane 10 being permeable to water, allows the water in the well fluid to contact the water-soluble radioactive material in seeder 8, dissolving small amounts of the radioactive material, and to return to the well through valve 12. The presence of radioactivity in the water which has passed through the seeder is detected by means of the radiation detector 5. Since the location of the detector in the well is known, the location of the point of water influx is also known. By changing the relative positioning of the selectively permeable membranes and substituting an oil-soluble radioactive material, points of entry of oil may likewise be located.

Molecular filter membranes such as hydropholic and hydrophilic membrances may be used which have a permeability of approximately 1–2 cubic centimeters per square centimeter per second at a pressure differential of 1 atmosphere. These membranes are normally hydrophilic but can be converted to hydrophobic by special treatment. These membrances are preferably backed up by porous material of a uniform porosity such as porous carbon disks, fritted glass, porous steel, or porous porcelain. A suitable hydrophilic membrane for use in the practice of my invention may be obtained from the A. G. Chemical Company, Inc., Pasadena, California, under the trade designation "Molecular filter membrane, type HA." Reference herein is made to "Application of Molecular Filter Membranes to the Analysis of Aerosols," Alexander Goetz, Am. J. Pub. Health 43, 150 (1953), for additional information concerning these membranes.

Another form which the seeder may take is shown diagrammatically at Figure 4. Positioned within tubular housing 4 is a T-shaped tubular element comprising tube 13 located concentrically with respect to housing 4 and tube 14 located transversely with respect to the housing and communicating with the outside through holes in the walls of housing 4; tube 14 also communicating with tube 13, thus forming a conduit from pumping unit 11 through the housing. Membranes 9a, permeable only to oil, allow oil from the well fluids from the pump 11 to contact the oil-soluble radioactive substance in seeder 8a and to return to the well through valve 12, permitting the location of points of oil entry. Membranes 10a, permeable only to water, located in the wall of housing 4 and in tube 14, allow the water in the well fluid to return directly to the well. The arrangement of elements in the modification of Figure 4 may likewise be changed to adapt the device for detection of points of water influx by substituting a water-soluble radioactive material for the oil-soluble radioactive material in seeder 8a and changing the relative positioning of the selectively permeable membranes.

A radioactive material useful for water seeding is potassium iodide with the iodine 131 isotope. Other useful water-soluble radioactive materials include:

Cobalt chloride _____ (Co–60)
FeCl$_3$ _____ (Fe–59)
NaCl _____ (Na–72 or Na–74)
Water-soluble sulfonates with S–37 or phosphates with P–34.

For oil seeding iodine 131 itself may be used. Among other oil-soluble radioactive substances, the following may be included:

Co naphthenate or stearate
Ferric naphthenate or stearate
Na naphthenate or stearate
High molecular weight sulfonates (naphthalene sulfonate)
High molecular weight phosphonates The signal from the detector may be relayed to the surface recorder 7 by any of the conventional methods employed in radioactivity logging such as by the following:

(1) An automatic impedance balance by which the counter output current across a large resistor is compared to a current from the surface across a small resistor. The variations in the current recorded at the surface are proportional to the counter output.

(2) A vibrator (interruptor) with preamplifier in the down-the-hole equipment and conduction of the preamplified signal by an insulated conductor.

(3) Frequency modulation of a carrier wave.

It is apparent that many modifications and variations of the invention as hereinbefore set forth may be made without departing from the spirit and scope thereof. The specific embodiment described is given by way of example only, and the invention is limited only by the terms of the appended claims.

I claim:

1. Apparatus for locating influx of formation fluid in a well bore, which apparatus comprises a radioactive seeder and radiation detector assembly, means for suspending and moving said assembly within a well bore, and means for transmitting the detection of radiation to the earth's surface; said assembly comprising an elongated tubular housing, fluid entry means for introducing fluid into said housing and fluid escape means for permitting flow of fluid through said housing, radioactive seeder means within said housing adapted to contain a fluid-soluble radioactive material in contact with at least a part of said fluid, a selectively permeable membrane interposed within said housing between said entry means and said radioactive seeder to permit selective flow of fluid to said radioactive seeder, and radiation detection means spaced apart and shielded from direct emanations from said radioactive seeder.

2. Apparatus for locating influx of formation fluid in a well bore which apparatus comprises a radioactive seeder and radiation detector assembly, means for suspending and moving said assembly within a well bore, and means for transmitting the detection of radiation to the earth's surface; said assembly comprising an elongated tubular housing, fluid entry means at one end of said housing and fluid escape means for permitting flow of fluid through said housing, radioactive seeder means within said housing and spaced apart from said fluid entry means, said seeder being adapted to contain a source of fluid-soluble radioactive material, at least one selectively permeable membrance interposed between said fluid entry means and said seeder, and adapted to permit selective flow of fluid to said radioactive seeder, further fluid escape means in said housing adjacent said radioactive seeder to permit flow of activated fluid from said housing and a radiation detector spaced apart from said radioactive seeder and shielded from direct emanations therefrom.

3. Apparatus as in claim 2 in which the fluid entry means includes a pump for forcing well fluids into and through said housing.

4. Apparatus for locating influx of formation fluid in a well bore, which apparatus comprises a radioactive seeder and radiation detector assembly, means for suspending and moving said assembly within a well bore, and means for transmitting the detection of radiation to the earth's surface; said assembly comprising an elongated tubular housing, fluid entry means at one end of said housing, radioactive seeder means within said housing and spaced apart from said fluid entry means said seeder being adapted to contain a source of fluid-soluble radioactive material, at least two selectively permeable membranes between said fluid entry means and said seeder, one of the permeable membranes being in the wall of said housing and forming a fluid escape means adapted to permit selective return flow of fluid to said well bore, the other of said permeable membranes being interposed within said housing and adapted to permit selective flow of fluid to said radioactive seeder, further fluid escape means in said housing adjacent said radioactive seeder to permit flow of activated fluid from said housing and a radiation detector spaced apart from said radioactive seeder and shielded from direct emanations therefrom.

5. Apparatus as in claim 4 in which the fluid entry means includes a pump for forcing well fluids into and through said housing.

6. Apparatus for locating influx of formation fluid in a well bore, which apparatus comprises a radioactive seeder and radiation detector assembly, metered means for suspending and moving said assembly within a well bore, and means for transmitting the detection of radiation to the earth's surface; said assembly comprising an elongated tubular housing, fluid entry means at one end of said housing for introducing well fluids into said housing, selectively permeable membrane fluid escape means in the walls of said housing for permitting flow of fluid through said housing, radioactive seeder means within said housing adapted to contain a source of fluid-soluble radioactive material, another membrane of different selective permeability from the first mentioned selectively permeable membrane interposed within said housing between the fluid escape means and said radioactive seeder, further fluid escape means in said housing adjacent said radioactive seeder to permit flow of activated fluid from said housing and a radiation detector spaced apart from said radioactive seeder and shielded from direct emanations therefrom.

7. Apparatus as in claim 6 in which the fluid entry means includes a pump for forcing well fluids into and through said housing.

8. Apparatus for locating influx of formation fluid in a well bore, which apparatus comprises a radioactive seeder and radiation detector assembly, adapted to be suspended and moved within a well bore, metered means for suspending and moving said assembly within a well bore and means for transmitting the detection of radiation to the earth's surface; said assembly comprising an elongated tubular housing, fluid entry means at one end of said housing for introducing well fluids into said housing, a second elongated tubular element within said housing comprising one section axial to said housing and at least one other section transverse thereto, the axial section of said tubular element being in direct fluid communication with said entry means and the transverse section adapted to be in direct fluid communication with the well bore through the wall of the housing, selectively permeable membrane fluid escape means in said second tubular element for permitting escape flow of fluid from said housing, at least one other membrane of different selective permeability in the walls of said second tubular element between the fluid entry means and the fluid escape means to permit flow of the remaining fluid component within said housing, radioactive seeder means within said housing spaced from said second tubular element adapted to contain a source of fluid-soluble radioactive material, further fluid escape means in said housing adjacent said radioactive seeder to permit escape flow of activated fluid from said housing and a radiation detector spaced apart from said radioactive seeder and shielded from direct emanations therefrom.

9. Apparatus as in claim 8 in which the fluid entry means includes a pump for forcing well fluids into and through said housing.

10. Apparatus for locating water influx in a producing well, which apparatus comprises a radioactive seeder and radiation detector assembly adapted to be suspended and moved within a well bore, metered means for suspending and moving said assembly within a well bore and means for transmitting the detection of radiation to the earth's surface; said assembly comprising an elongated tubular housing, entry means for introducing well fluids into said housing, oil-permeable membrane escape means for permitting flow of oil from said housing, radioactive seeder means within said housing adapted to contain a source of water-soluble radioactive material, a water-permeable membrane interposed within said housing between the oil-escape means and the radioactive seeder, escape means for activated water adjacent said radioactive seeder and a radiation detector spaced apart from the seeder and shielded from direct emanations therefrom.

11. Apparatus as in claim 10 in which the fluid entry means includes a pump for forcing well fluids into and through said assembly housing.

12. Apparatus for locating oil influx in a producing well, which apparatus comprises a radioactive seeder and radiation detector assembly adapted to be suspended and moved within a well bore, metered means for suspending and moving said assembly within a well bore and means for transmitting the detection of radiation to the earth's surface; said assembly comprising an elongated tubular housing, entry means for introducing well fluids into said housing, water-permeable membrane escape means for permitting flow of water from said housing, radioactive seeder means within said housing adapted to contain a source of oil-soluble radioactive material, an oil-permeable membrane within said housing interposed between said fluid entry means and said radioactive seeder to permit flow of the oil in the well fluids in contact with said seeder, escape means for activated oil adjacent said radioactive seeder and a radiation detector spaced apart from the seeder and shielded from direct emanations therefrom.

13. Apparatus as in claim 12 in which the fluid entry means includes a pump for forcing well fluids into and through said assembly housing.

References Cited in the file of this patent

UNITED STATES PATENTS

| | | |
|---|---|---|
| 2,433,718 | Teplitz | Dec. 30, 1947 |
| 2,453,456 | Piety | Nov. 9, 1948 |
| 2,659,046 | Arps | Nov. 10, 1953 |
| 2,661,550 | Graham | Dec. 8, 1953 |